(12) United States Patent  
Barkin et al.

(10) Patent No.: US 9,347,808 B2
(45) Date of Patent: May 24, 2016

(54) FLUSH MOUNTED ULTRASONIC TRANSDUCER ARRAYS FOR FLOW MEASUREMENT

(71) Applicant: TEXAS INSTRUMENTS INCORPORATED, Dallas, TX (US)

(72) Inventors: David B. Barkin, San Francisco, CA (US); Ira O. Wygant, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 14/340,254

(22) Filed: Jul. 24, 2014

(65) Prior Publication Data

US 2016/0025537 A1   Jan. 28, 2016

(51) Int. Cl.
*G01F 1/66*  (2006.01)
(52) U.S. Cl.
CPC ............... *G01F 1/667* (2013.01); *G01F 1/662* (2013.01)

(58) Field of Classification Search
CPC .......................................................... G01F 1/66
USPC .......................................... 73/861.27, 861.28
See application file for complete search history.

(56) References Cited

U.S. PATENT DOCUMENTS

| | | | | |
|---|---|---|---|---|
| 5,040,415 A | * | 8/1991 | Barkhoudarian | G01F 1/667 374/143 |
| 5,719,329 A | * | 2/1998 | Jepson | G01F 1/24 73/597 |
| 7,628,081 B1 | * | 12/2009 | Feller | G01F 1/66 73/861.27 |

* cited by examiner

*Primary Examiner* — Jewel V Thompson
(74) *Attorney, Agent, or Firm* — John R. Pessetto; Frank D. Cimino

(57) ABSTRACT

A flow meter system includes a first ultrasonic transducer array to be flush-mounted to a pipe. The system also includes a second ultrasonic transducer array to be flush-mounted to the pipe. The system further includes a controller coupled to the first and second ultrasonic transducer arrays and configured to cause bidirectional beam steering between the first and second ultrasonic transducer arrays.

3 Claims, 6 Drawing Sheets

FLUSH MOUNTED ULTRASONIC TRANSDUCER ARRAYS FOR FLOW MEASUREMENT

CROSS-REFERENCE TO RELATED APPLICATION

N/A.

BACKGROUND

A number of applications require the ability to measure flow rate in a pipe. Examples include water meters, gas meters, industrial process control, etc. Often, flow measurement systems involve the use of angled acoustic ports to mount ultrasonic transducers. Such angled acoustic ports, however, create turbulence in the flow of the medium in the pipe which thereby causes measurement errors.

BRIEF DESCRIPTION OF THE DRAWINGS

For a detailed description of various examples, reference will now be made to the accompanying drawings in which.

DETAILED DESCRIPTION

The use of angled ports may create measurement errors for flow measurement systems as explained above. An ultrasonic transducer array with beamforming advantageously obviates the need for angled ports and may provide additional features and performance enhancements.

Figure 1:
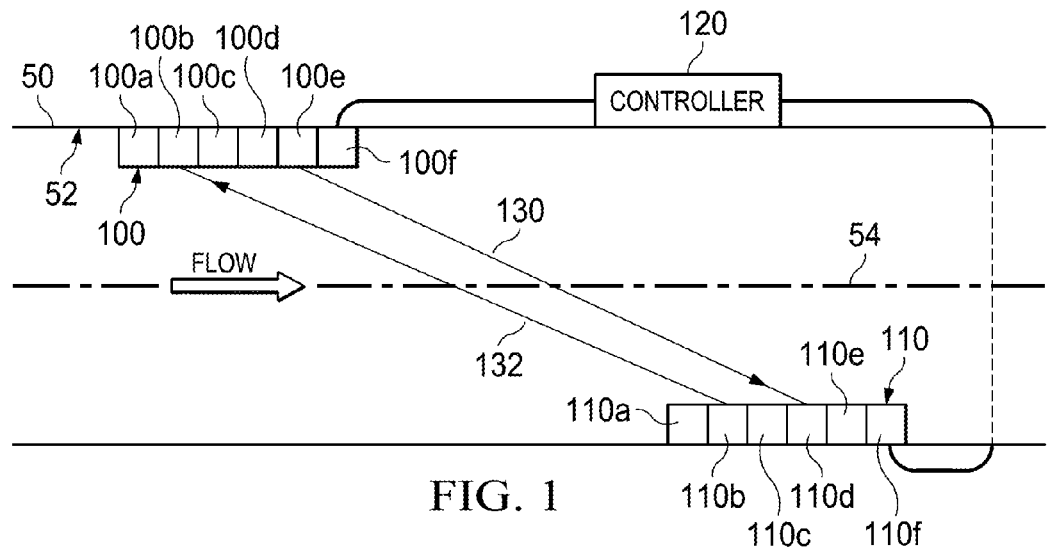
FIG. 1 illustrates an exemplary flow meter system in accordance with various embodiments.

FIG. 1 illustrates a pipe 50 to which a flow meter system in accordance with the preferred embodiments is mounted. The flow meter system includes a first ultrasonic transducer array 100 flush-mounted to an interior wall 52 of the pipe, a second ultrasonic transducer array 110 also flush-mounted to the interior wall 52 of the pipe, and a controller 120 in communication with both ultrasonic transducer arrays 100, 110. The controller 120 may be external to the pipe 50. The controller 120 may comprise a programmable microcontroller or any other type of electrical device capable of performing the functions described herein attributable to the controller 120. The communication pathway between controller 120 and ultrasonic transducer arrays 100, 110 may be wired or wireless.

The transducer arrays described herein are "flush-mounted" to a pipe wall. Such mounting structures include attachment of the array to an interior wall of the pipe as depicted in FIG. 1. Alternatively, other embodiments include a hole in the pipe, and a flush mounted transducer attached, sealed with an O-ring, at the site of the hole in the pipe. The surface of the transducer is flush with an interior surface of the pipe. In yet other embodiments, the transducer can be mounted on the exterior of the pipe, and the beam can be transmitted through the pipe, and steered to another transducer as described below. Each ultrasonic transducer array 100, 110 preferably includes a plurality of ultrasonic transducers. Ultrasonic transducer array 100 array, for example, includes transducers 100a, 100b, 100c, 100d, 100e, and 100f as shown, but can have fewer or more than six transducers (also called transducer "elements"). Similarly, ultrasonic transducer array 110 may include six transducers 110a-110f (or more than six transducers or fewer than six transducers).

Each transducer element preferably is omnidirectional. The transducer arrays may be constructed from bulk piezoelectric materials or use micro-electrical mechanical systems (MEMS) techniques. Bulk piezoelectric transducers may be constructed from piezoelectric materials such as lead zirconium titanate PZT). Bulk piezoelectric transducer arrays may be formed by dicing the material into individual elements or piecing together an array from discrete transducers. Suitable examples of MEMS transducers are capacitive micro-machined ultrasonic transducers (CMUTs) and piezoelectric micro-machined ultrasonic transducers (PMUTs). A CMUT is a type of capacitively-actuated MEMS transducer constructed using typical MEMS techniques. A PMUT leverages MEMS-deposited piezoelectric materials such as AlN (aluminum nitride) or PZT.

Figure 2:
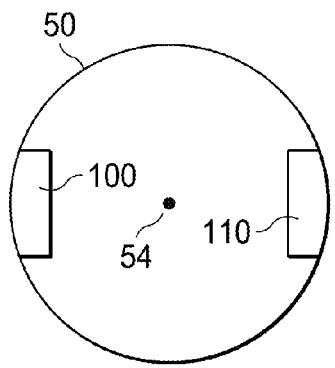
FIG. 2 shows a cross section of a pipe with a pair of ultrasonic transducers flush-mounted therein.

FIG. 1 illustrates that the two transducer arrays 100 and 110 are flush-mounted to an interior wall 52 of pipe 50 on opposite sides of central axis 54 that extends longitudinally through the center of the pipe 50. In the example of FIG. 1, the transducer arrays 100, 110 are mounted circumferentially 180 degrees opposite each other while also staggered axially from each other. That is, not only are the arrays positioned radially opposite one another, but one array is mounted further down the pipe in an axial direction from the other array. FIG. 2 further illustrates the radial separation of the arrays about central axis 54 of the pipe.

As used herein, the terms "axial" and "axially" generally mean along or parallel to central axis 54, while the terms "radial" and "radially" generally mean perpendicular to the central axis.

In accordance with the preferred embodiments, the controller 120 is configured to cause bidirectional beam steering between the first and second ultrasonic transducer arrays 100 and 110 as indicated by arrows 130 and 132 in FIG. 1. The controller first applies a set of signals to at least some of the transducers of the first transducer array 100 but with a variable phase difference across the various signals. In one scenario, for example, the same signal (e.g., same frequency and amplitude) is applied to each transducer element but with a different delay than the signals applied to the other transducer elements of the array. By varying the delay across the various transducer elements, the ultrasonic signals transmitted by the transducer elements of array 100 may arrive at or near the same time at a receiving transducer element of the second array 110. The amount of time delay is a function of the distance between the elements in each array (110*a*-100*f* and 110*a*-110*f*), the type of media flowing in the pipe 50, and the flow rate of the media. Because multiple transducers are used to transmit an ultrasonic signal, the distances between the transducers and the receiving transducer element varies. For example, element 100*f* is closer to element 110*a* than is element 100*a*. Thus, the transmitting transducer element that is closest to the receiving transducer element has the most phase (time) delay. By adjusting the phase difference appropriately, the point on the opposite pipe wall in which the transmitted signals superimpose with little or no phase delay to recreate the original signal can be tightly controlled.

Figure 3:
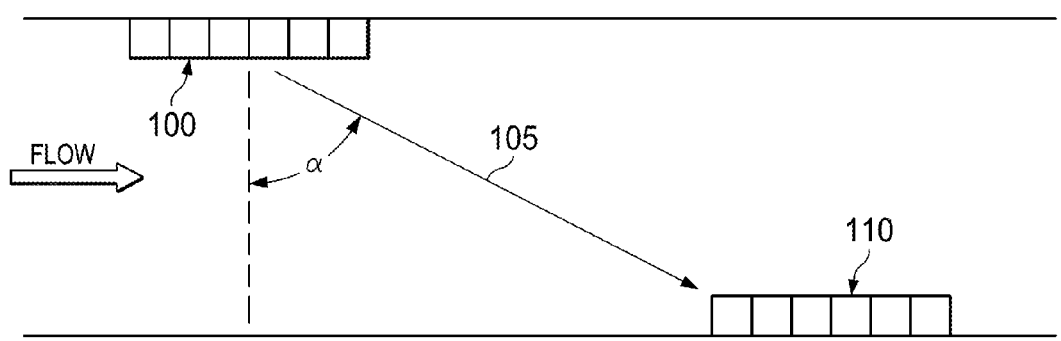
FIG. 3 depicts the angle of an ultrasonic beam between pairs of flush-mounted ultrasonic transducer arrays.

FIG. 3 shows the two transducer arrays 100 and 110. The arrow 105 illustrates the line from the transmitting transducer array 100 to the location at which the various phase delayed ultrasonic signals superimpose with little or no delay. Angle α is the angle of the beam and is measured between arrow 105 and a vertical axis, although the angle of the beam may be measured as well between arrow 105 and a horizontal axis (longitudinal axis of the pipe).

In some embodiments the signals applied to each transducer in an array functioning as transmitters are the same in terms of amplitude and frequency, varying only in delay. In other embodiments, the amplitude, frequency, and phase of the various signals may differ. The phases of such signals are still controlled by controller 120 so as to cause sufficient ultrasonic signal amplitude to be detected by the receiving array.

Preferably, the controller 120 causes a transducer array to function as a transmitter and the other array to function as a receiver. Then, the process is reversed with the formerly transmitting array now functioning as the receiver and the former receiving array now functioning as the transmitter. Ultrasonic signals transmitted generally with the flow (e.g., from array 100 to array 110) travel faster and thus take less time to be received by the other array than signal transmitted against the flow (e.g., from array 110 to array 100). Thus, the flow rate of the medium can be determined by, for example, a time of flight difference between the ultrasonic signals in each direction.

Figure 4:
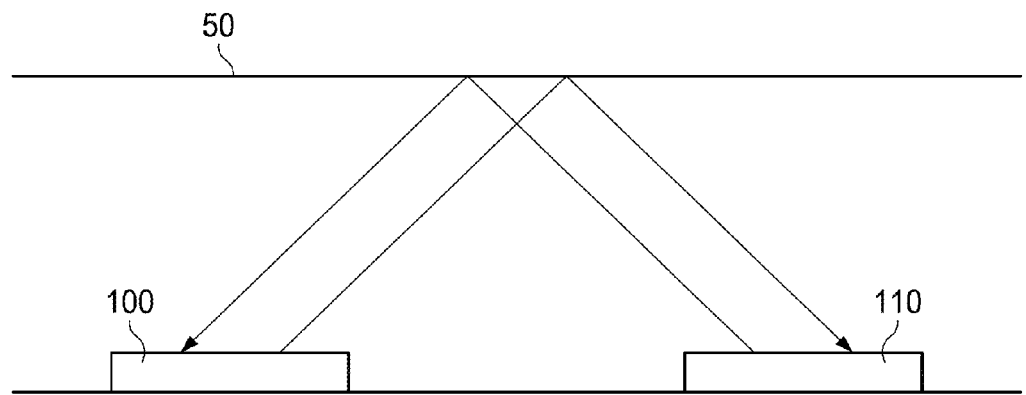
FIG. 4 illustrates an embodiment in which the transducer arrays are mounted collinearly in a longitudinal direction in the pipe.

FIG. 1 illustrates an embodiment in which the transmitted ultrasonic signals are transmitted from a transmitting array directly to the receiving array. However, the transducer arrays may be mounted inside pipe 50 in configurations other than as shown in FIG. 1 as well. For example, FIG. 4 illustrates that transducer arrays 100 and 110 may be mounted inside pipe 50 longitudinally in line with each other (i.e., on a common side with respect to longitudinal axis 54). The transmitted ultrasonic signals may be steered by controller 120 so as to reflect off the opposite wall before being received by the receiving array as shown. The controller 120 is still present in this embodiment but is not shown in FIG. 4 (or the examples of FIGS. 5 and 6) for simplicity.

Figure 5:
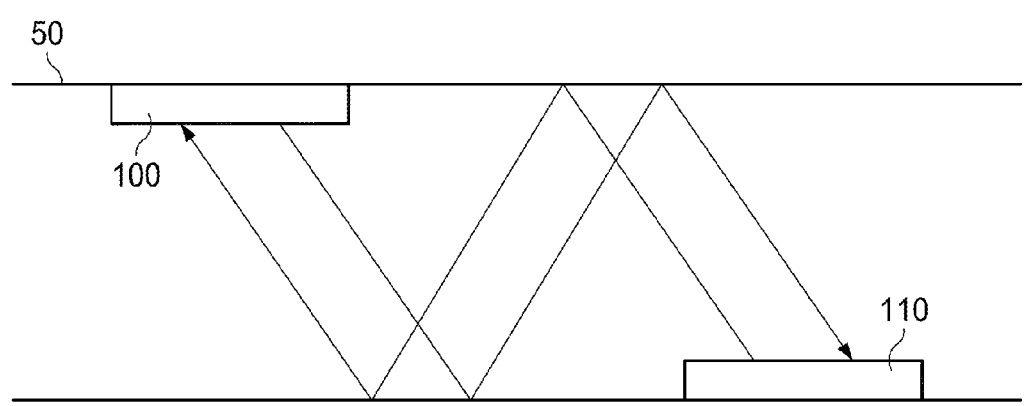
FIG. 5 illustrates an embodiment in which ultrasonic beams can be reflected off the walls of the pipe before being received by a receiving transducer array.

FIG. 5 illustrates an embodiment in which the transducers are mounted in pip 50 similarly to FIG. 1 but the controller 120 causes the beam to be steered to reflect off the pipe wall 52 at least twice before being received by the receiving array.

In other embodiments, the first and second ultrasonic transducer arrays are positioned with no axial separation along the pipe, and the controller is configured to cause a flow measurement to be made by detecting the steering angle required for the beam from the first transducer array to be steered to the center of the second transducer array.

Figure 6:
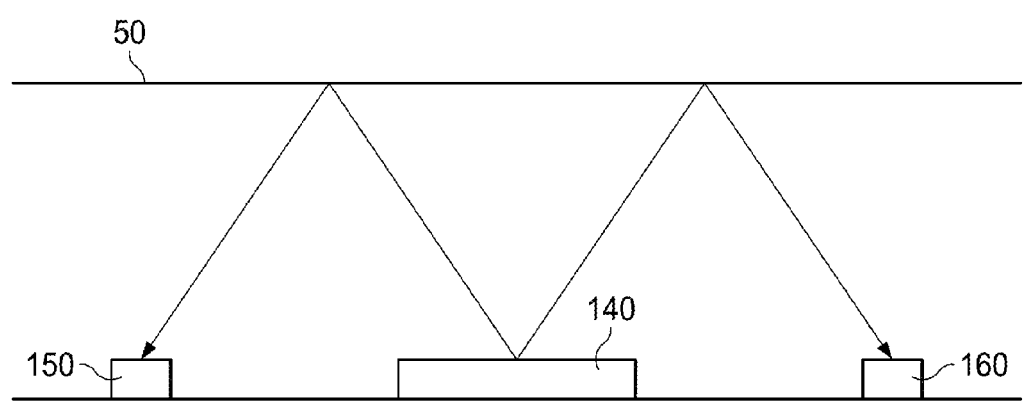
FIG. 6 illustrates one transmitting transducer array and a pair of receiving transducer elements mounted longitudinally on opposite sides of the transmitting array.

FIG. 6 shows an embodiment including three transducers or transducer arrays. Array 140 is a transmit only array and, under control of controller 120, steers beams in opposite directions to reflect off the opposite pipe wall before being received by receive transducers 150 and 160. The time difference between the time the two receive transducers 150, 160 receive the ultrasonic signals is used to determine the flow rate of the medium. The transducer arrays 140, 150, and 160 of FIG. 6 may be separate components or may be provided in a single integrated package in which case such an integrated transducer measures the echoed signal from the opposite wall.

Figure 7:
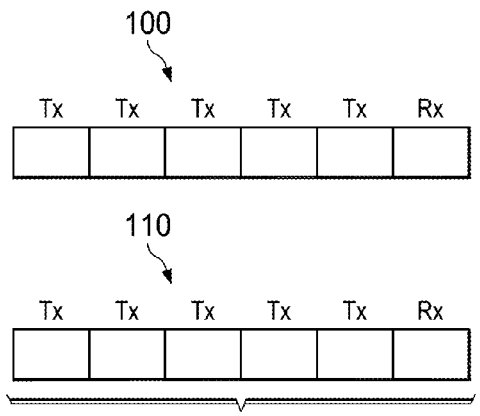
FIG. 7 shows an arrangement for the transducer arrays in which one transducer element is a dedicated receive-only element and the rest are transmit-only elements.

FIGS. 7-10 depict various configurations of the use of the transducer elements of the arrays 100 and 110 to transmit or receive ultrasonic signals. In the example of FIG. 7, one of the elements in each array is dedicated as a receive-only transducer (designated as "RX") while the remaining transducers in that array are dedicated as transmit-only transducers (designated as "TX").

Figure 8:
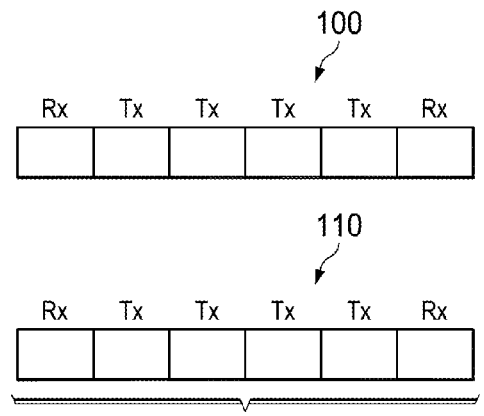
FIG. 8 shows an arrangement for the transducer arrays in which multiple transducer elements are dedicated receive-only element and the rest are transmit-only elements.

FIG. 8 is similar to FIG. 7 but more than one transducer element is dedicated as a receive-only element with the remaining transducer elements being transmit-only elements. In FIG. 8, two elements are receive-only elements and preferably are on opposite ends of each array as shown, but can be located elsewhere as well.

Figure 9:
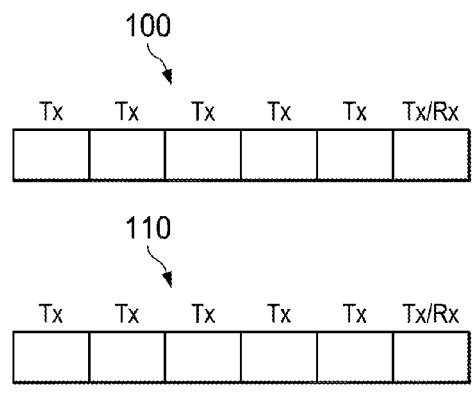
FIG. 9 shows an arrangement for the transducer arrays in which one transducer element is configurable by the controller to be either a receiver or a transmitter.

In FIG. 9, one transducer element is selectively configurable by the controller 120 to function as a transmit transducer or as a receive transducer (designed as "TX/RX"), while the remaining transducers are dedicated transmit-only transducers. This embodiment permits all of the array's elements to be used to transmit ultrasonic signals, but can repurpose one of the elements to receive when that array is to receive ultrasonic signals.

Figure 10:
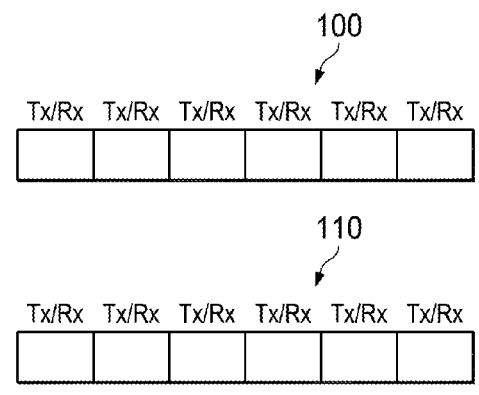
FIG. 10 shows an arrangement for the transducer arrays in which each of the transducer elements is configurable by the controller to be either a receiver or a transmitter.

FIG. 10 illustrates an example in which each transducer is selectively configurable by the controller 120 to function as a transmit transducer or as a receive transducer.

Figure 11:
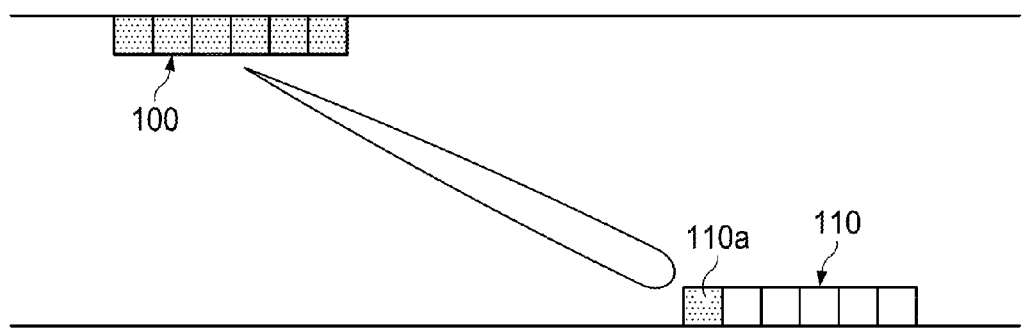
FIG. 11 illustrates the use of a multi-transducer element array for transmission of ultrasonic signals and the use of a single transducer element for reception purposes.

FIG. 11 shows an example in which transducer array 100 is used to transmit and transducer array 110 is used to receive. In this example, all of the elements of array 100 are used to transmit ultrasonic signals. However, only a single element in array 110 (element 110*a*) is used to receive. Signals received by the remaining elements in array 110 are ignored by the controller 120 and thus not used to compute flow rate.

Flow measurement systems that use angled acoustic ports formed in the pipes effectively direct their acoustic beams to an angle alpha that is not perpendicular to the pipe wall by purely mechanical means. Such systems thus generally have a fairly narrow dynamic range in terms of flow rates they can accurately measure. As flow rates change too much, the transmitted beam may miss the target receiving angled acoustic ports.

Figure 12:
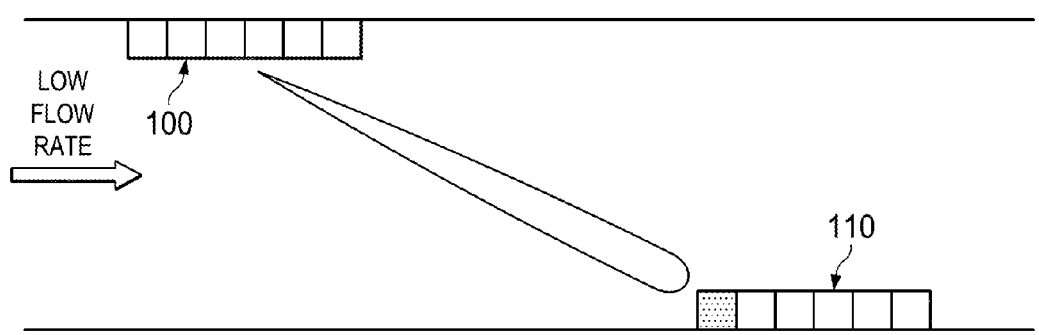
FIGS. 12 and 13 illustrate how a beam's angle may be changed due to changes in flow rate.
Figure 13:
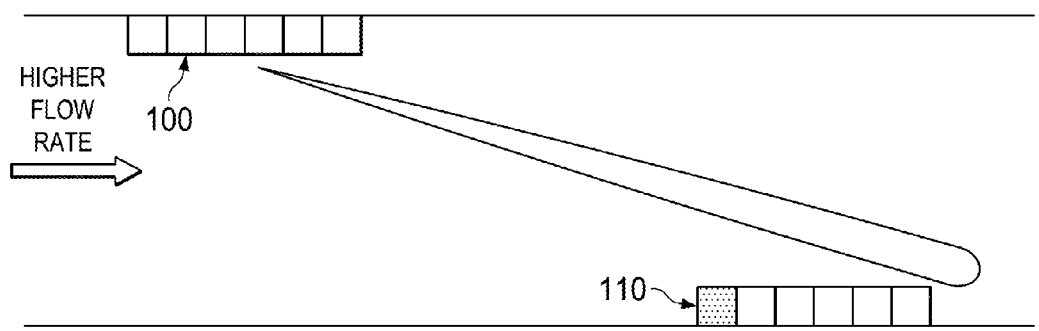

The use of ultrasonic transducer arrays as described herein permits for a much wider dynamic range of accurately measurable flow rates because the beam angles can be controlled to ensure the beam hits the target receiving transducer array. FIG. 12 shows an example of the beam being angled directly onto the receiving array 110. In the example of FIG. 13, the flow rate has increased to the point that the beam no longer hits the receiving array 110. However, the controller 120 can detect this condition and adjust the phase delays of the constituent signals provided to the various transmit transducer elements to "re-steer" the beam back to a more optimal target spot. The amount of delay needed to re-steer the beam can also provide information about the flow rate. This process is described below.

Figure 14:
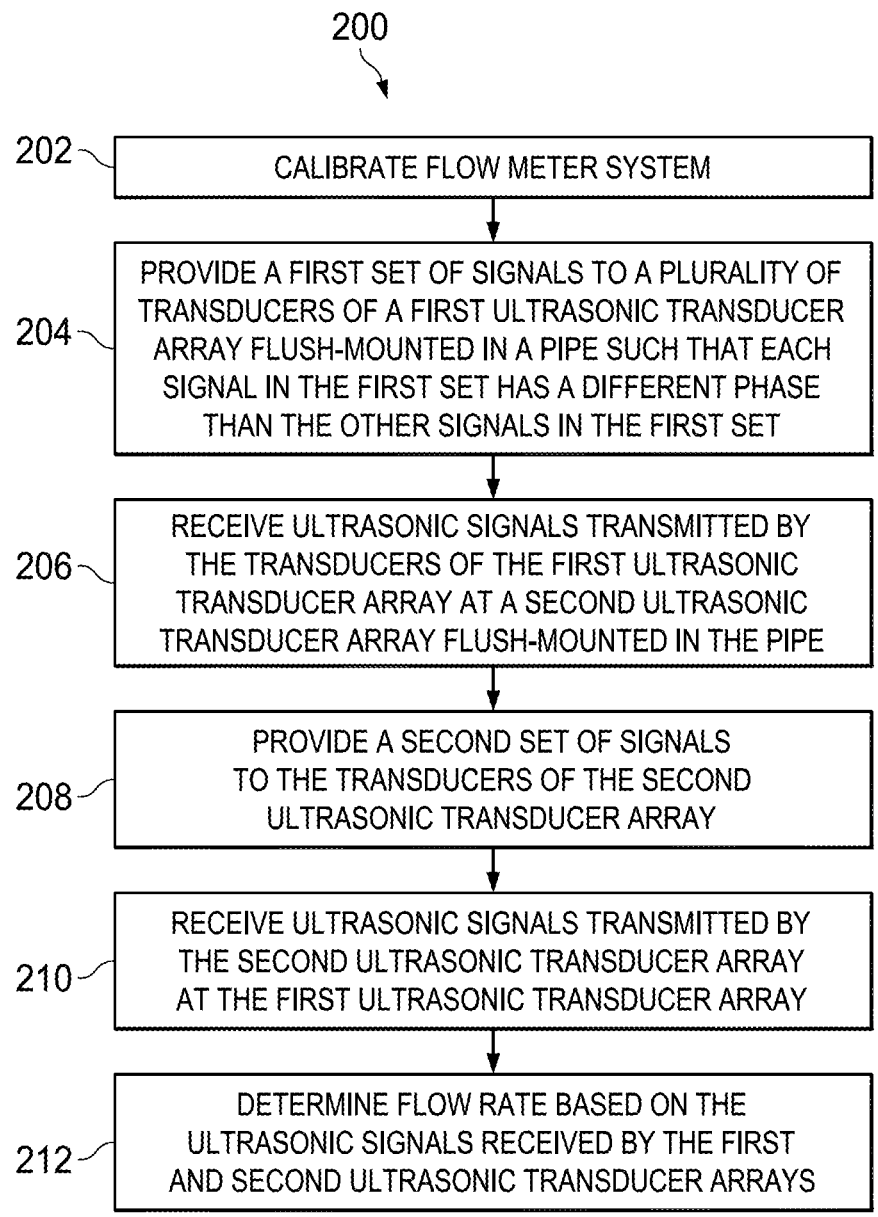
FIG. 14 shows a method in accordance with various examples of the disclosure.

FIG. 14 illustrates a method 200 to measure flow rate using the embodiments described herein. At 202, the method includes calibrating the flow meter system. The calibration process may be implemented by the controller 120. To calibrate the system, the controller may be programmed a priori by information that specifies an expected flow rate, media type and dimensional data (e.g., pipe diameter, axial separation of the transducer arrays, etc.). The controller 120 may then calculate the amount of delay to impart each signal provided to one of the elements of the transducer array during a transmission of an ultrasonic signal so as to angle the beam to the other array. The controller 120 may measure the signal amplitude detected by the receiving transducer array. The controller 120 then may iteratively vary the delay and measure the received signal amplitude until a maximum signal amplitude is detected. The delay resulting in a maximum received signal amplitude (or at least an amplitude over a threshold) is the delay to be used during flow rate measurements.

At 204, the method includes providing a first set of signals to a plurality of transducers in a first ultrasonic transducer array e.g., array 100) flush-mounted in pipe 50 such that each such signal in the first set has a different phase than the other signals in the first set.

Then at 206, the method includes receiving ultrasonic signals transmitted by the transducers of the first ultrasonic transducer array at a second ultrasonic transducer array (e.g., array 110) flush-mounted in the pipe. The second ultrasonic transducer array also comprises a plurality of transducers and the received ultrasonic signals received by at least one transducer of the second ultrasonic transducer array.

At 208, the method includes providing a second set of signals to a plurality of transducers in the second ultrasonic transducer array such that each such signal in the second set has a different phase than the other signals in the second set. At 210, the method includes receiving ultrasonic signals transmitted by the transducers of the second ultrasonic transducer array at the first ultrasonic transducer array. The ultrasonic signals received by the first ultrasonic transducer array are received by at least one transducer of the first ultrasonic transducer array.

Finally, at 212, flow rate is determined (e.g., by controller 120) based on the ultrasonic signals received by each of the first and second ultrasonic transducer arrays. For example, a time-of-flight calculation can be made to compute flow rate.

Figure 15:
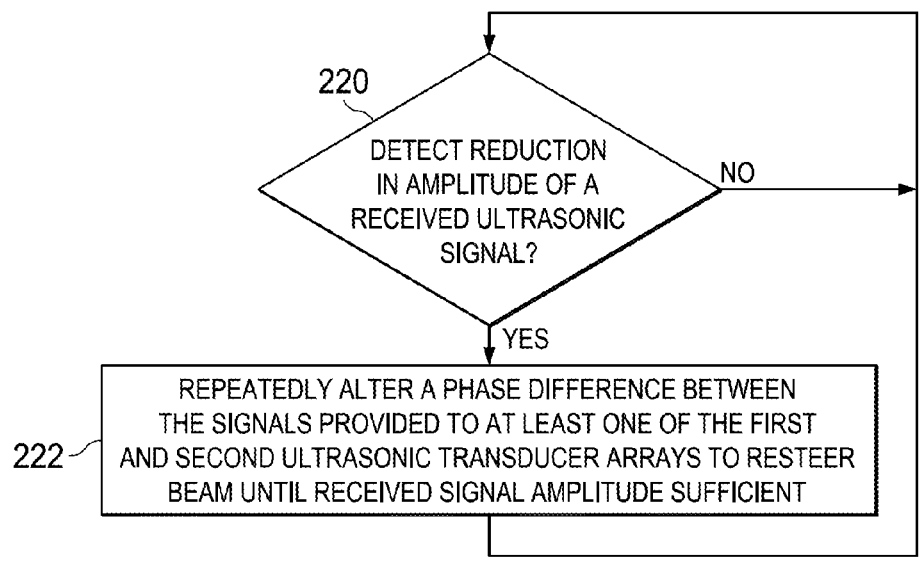
FIG. 15 illustrates a method for re-steering the beam in accordance with various examples of the disclosure.

FIG. 15 illustrates a method for re-steering the beam which may be helpful if the flow rate changes too much. At 220, the method includes the controller 120 detecting a reduction in the amplitude of the received ultrasonic beam during either one or both of the reciprocal beam transmissions (from array 100 to 110 or array 110 to 100). If the amplitude has not reduced or has not reduced by more than a threshold amount, control loops back to operation 220.

If, however, a change in calculated flow rate is detected, and also a reduction in received signal amplitude is detected to be more than a threshold amount, then at operation 220, the controller 120 alters a phase difference between the signals provided to at least one of the first and second ultrasonic transducer arrays to thereby adjust the angle of the beam until the received signal amplitude is sufficient (above a threshold). There can be temporary reductions in amplitude due to "Bubbles" in the pipe. The algorithm to adjust beam angle should determine that if a change in beam angle does not increase the received signal amplitude, the beam will return to the angle that maximizes received signal amplitude.

As noted above, some embodiments use multiple transmit and receive elements. Beamsteering can be accomplished by varying the delay of the transmitted signals or the received signals. Varying the delay of the transmitted signals may be more hardware efficient that varying the received signals, although varying the received signal delay is within the scope of this disclosure as well. If only a single element is used to receive, then beamsteering is done with the transmit signals, and vice versa.

Figure 16:
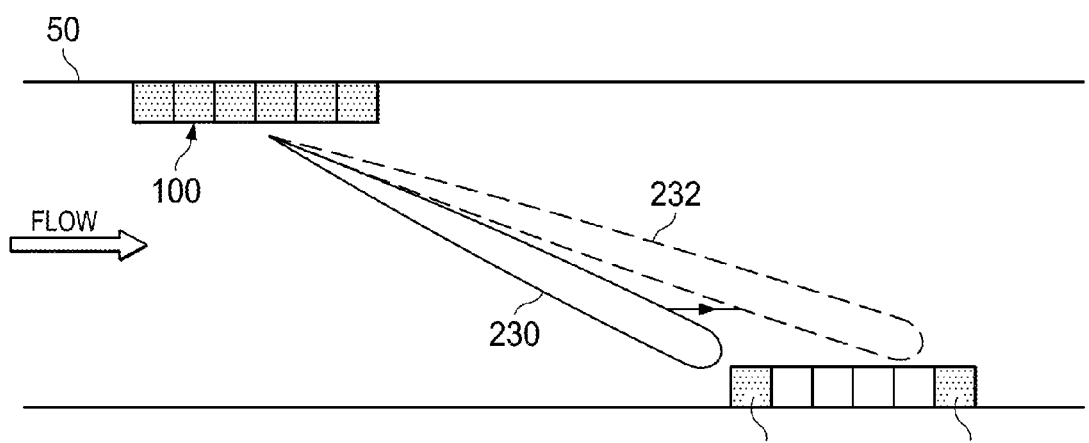
FIG. 16 shows an example of the detection of a change in the beam angle based on the use of multiple receive transducer elements.

In some embodiments and as noted above, multiple transducer elements may be used as receive transducer elements (e.g., FIG. 8). By comparing the received signal amplitudes of all of such receive transducer elements, the controller 120 can determine whether the flow rate is increasing or decreasing, not just that the flow rate has changed. For example and referring to FIG. 16, the beam 230 initially may be configured to impinge on receive transducer element 110a, but transducer element 110f is also in a receive mode by controller 120. If the flow rate increases, then the beam may effectively move axially down the pipe in the direction of flow of the medium from 230 to 232. When that happens, the received signal amplitude from receive transducer element 110a begins to decrease and the received signal amplitude from receive transducer element 110f begins to increase. The controller 120 detects this change and determines that the flow rate has increased. The opposite is also true. If the flow rate decreases, the received signal amplitude from receive transducer element 110a begins to increase, but the received signal amplitude from receive transducer element 110f begins to decrease. A reduction in the received signal amplitudes of transducer elements 110a and and an increase in the received signal amplitude of transducer element 110f indicates to the controller 120 that the flow rate has decreased. If the beam is steered so that the center of the beam is outside of the range between 110a and 110f, than the beam can be re-steered to the center of the receive array (110). The re-steering process illustrated in FIG. 15 can be performed to recalibrate the system thereby imparting the system with a substantially wide dynamic range in terms of measurable flow rates.

In some embodiments, the flow rate can be determined from the beam angle. That is, the flow rate can be calculated based on the phase delays needed to cause a transmitted set of ultrasonic signals to arrive at the receiving transducer array with little or no phase delay. For example, a higher flow rate requires more beamsteering to return the beam to its calibrated position.

Some embodiments include a flow-meter system that includes more than two ultrasonic transducer arrays. Such systems employ multiple pairs of transducer arrays to measure the flow rate. Each such array is flush-mounted as described above. Any transducer can steer its beam to any other transducer. The flow rate can then be calculated based on multiple different time-of-flight paths. Such embodiments provide a tomographic image of the flow through the pipe.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
providing a first set of signals to a plurality of transducers in a first ultrasonic transducer array flush-mounted in a pipe such that each such signal in the first set has a different phase than the other signals in the first set;
receiving ultrasonic signals transmitted by the transducers of the first ultrasonic transducer array at a second ultrasonic transducer array flush-mounted in the pipe, the second ultrasonic transducer array also comprising a plurality of transducers and the received ultrasonic signals received by at least one transducer of the second ultrasonic transducer array;
providing a second set of signals to a plurality of transducers in a second ultrasonic transducer array such that each such signal in the second set has a different phase than the other signals in the second set;
receiving ultrasonic signals transmitted by the transducers of the second ultrasonic transducer array at the first ultrasonic transducer array, the ultrasonic signals received by the first ultrasonic transducer array being received by at least one transducer of the first ultrasonic transducer array; and
determining a flow rate based on the ultrasonic signals received by each of the first and second ultrasonic transducer arrays.

2. The method of claim 1 further comprising:
detecting a reduction in amplitude of a received ultrasonic signal; and
as a result of detecting an amplitude reduction, altering a phase difference between the signals provided to at least one of the first and second ultrasonic transducer arrays.

3. A flow meter system, comprising:
an ultrasonic transducer array flush-mounted to a pipe and configured to transmit ultrasonic signals;
a first ultrasonic transducer flush-mounted to the pipe and positioned along a first longitudinal direction of the pipe from the ultrasonic transducer array, wherein the first ultrasonic transducer is configured to receive ultrasonic signals;
a second ultrasonic transducer flush-mounted to the pipe and positioned along a second longitudinal direction of the pipe from the ultrasonic transducer array, wherein the second ultrasonic transducer is configured to receive ultrasonic signals, and wherein the second longitudinal direction is in an opposite longitudinal direction from the ultrasonic transducer array as the first longitudinal direction and;
a controller coupled to the first and second ultrasonic transducers and configured to cause the ultrasonic transducer array to transmit ultrasonic beams in the first and second directions towards the respective first and second ultrasonic transducers and to determine flow rate based on the ultrasonic signals received by the first and second ultrasonic transducers.

* * * * *

UNITED STATES PATENT AND TRADEMARK OFFICE
CERTIFICATE OF CORRECTION

PATENT NO. : 9,347,808 B2  
APPLICATION NO. : 14/340254  
DATED : May 24, 2016  
INVENTOR(S) : David B. Barkin et al.

Page 1 of 1

It is certified that error appears in the above-identified patent and that said Letters Patent is hereby corrected as shown below:

In the Claims

In Col. 7, line 14, replace [[a second ultrasonic]] with --the second ultrasonic--.

Signed and Sealed this  
Nineteenth Day of July, 2016

Michelle K. Lee  
*Director of the United States Patent and Trademark Office*